United States Patent Office 2,765,128
Patented Oct. 2, 1956

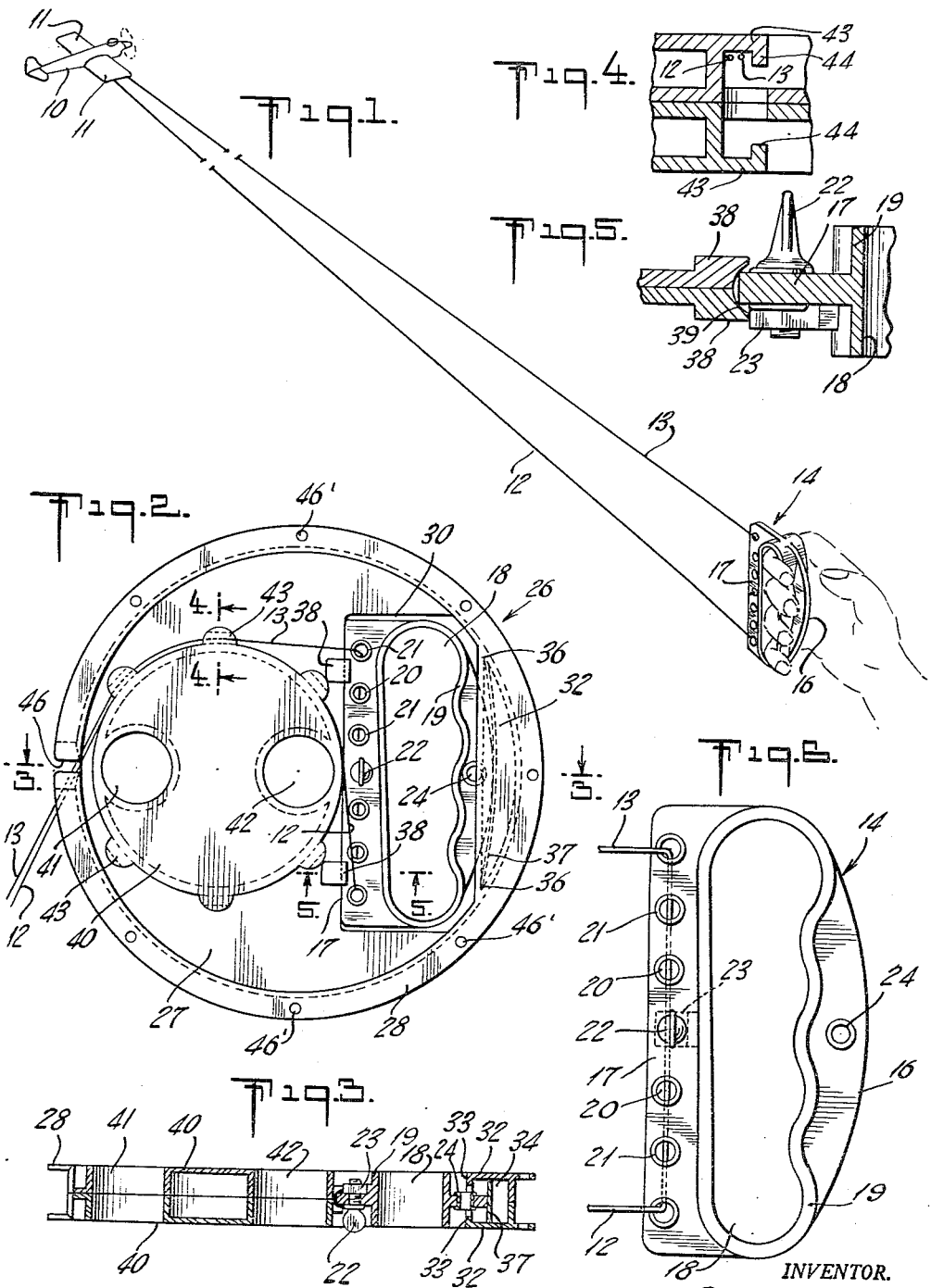

2,765,128

COMBINED LINE STORAGE AND CONTROL DEVICE

Robert M. Barth, Pelham Manor, N. Y., assignor to Price-Driscoll Corporation, New York, N. Y., a corporation of New York Application August 13, 1952, Serial No. 304,123

2 Claims. (Cl. 242—96)

The present invention relates to an improved control apparatus for line controlled mobile devices and it relates more particularly to an improved device for the line control of self-powered captive model aircraft or model surface craft. While not to be limited thereto, the present invention will be described in relation to use with captive model aircraft.

A popular pastime is the flying of captive, self-powered model aircraft since such flying requires a minimum of space and the aircraft can be always under the control of an operator and can be caused to perform many complex maneuvers. The captive model aircraft is generally controlled by varying the elevators thereby varying the altitude of the aircraft. The elevators are controlled by means of a pair of transversely spaced flexible control lines extending from a manual control element held by the operator to a lever mounted in the aircraft. The lever in turn is coupled to the elevators whereby a change in position of the lever results in a corresponding change in the raising or lowering of the elevators. Through this system, the operator, by shifting the relative longitudinal position of the control line by manipulation of the control element, may vary the elevators and thereby control the path of flight of the captive aircraft. The model aircraft will traverse paths along the surface of a sphere with the operator at its center and of a radius substantially equal to the length of the control lines. By the proper manipulation of the manual control element, the aircraft can be caused to execute complex flying patterns such as horizontal and vertical eights, three leaf clovers, etc.

However, in order to perform such maneuvers properly, the aircraft must always be under the complete control of the operator, who, in turn, must be responsive to and be capable of anticipating the motion of the aircraft; that is, he should always have the "feel" of the aircraft. An important factor affecting the "feel" of the aircraft is the manual control element which should be firmly secured to the control lines, should be relatively rigid and of light weight and should be comfortable to grasp. The control lines should be of uniform length and characterized by the absence of kinks, snarls, twists or any deformation which might cause variations not under the manipulation of the operator. As a consequence, it is extremely important that the control lines be properly stored when not in use so as to eliminate any of the above deformations.

There have been many attempts to provide devices for the line control of captive model aircraft and for the storage of the control lines, but these devices have possessed numerous drawbacks and have not proven successful. For the most part, they have been complicated and bulky, the complexity resulting in an expensive article and the bulk contributing to inconvenience, but even more important greatly interfering with the maneuvering of the captive model aircraft.

Another disadvantage generally met with in the present control line storage and control devices is the presence of play between the device and the control lines which leads to uncontrolled instability.

It is, therefore, a principal object of the present invention to provide an improved control device for line controlled captive, self-powered model air and surface craft.

Another object of the present invention is to provide an improved manual control element and storage device for control lines employed with captive, self-powered model air and surface craft.

Still another object of the present invention is to provide an improved manual control element and storage device for model air and surface craft control lines by means of which the control of the aircraft is greatly facilitated and improved, and complex maneuvers may be safely executed.

A further object of the present invention is to provide an improved manual control element and storage device for model air and surface craft control lines which device is compact, simple, rugged, easy to operate and is capable of storing long lengths of control line with no undesirable or permanent distortion imparted thereto.

Still a further object of the present invention is to provide an improved manual control element and storage device for captive model air and surface craft control lines wherein the control lines may be simply and rapidly stored or released and placed in condition for use.

Another object of the present invention is to provide an improved manual control element and storage device for captive model air and surface craft wherein all the requirements for complete control and maneuverability of the captive aircraft are fully met.

The above and other objects of the present invention will become apparent from a reading of the following description taken in conjunction with the accompanying drawing wherein:

Figure 1 is a perspective view showing the improved control member employed with a captive self-powered model aircraft;

Figure 2 is a top plan view of a preferred embodiment of the present invention;

Figure 3 is a sectional view taken along line 3—3 of Figure 2;

Figure 4 is a sectional view taken along line 4—4 of Figure 2;

Figure 5 is a sectional view taken along line 5—5 of Figure 2; and

Figure 6 is an enlarged detail plan view of the improved manual control member.

The present invention broadly contemplates a control and storage device comprising a manual control member provided with means for engaging control lines at spaced points along said manual control member and a control line storage reel provided with means releasably engaging and retaining said manual control member.

In accordance with a preferred embodiment of the present invention, the reel comprises a sheave like member consisting of a flat disc shaped web having formed thereon a peripheral channel having its groove facing radially outwardly. The manual control member is likewise substantially flat and provided with a lengthwise extending opening for accommodating the fingers of an operator, and dividing the member into a hand grip portion and a line engaging portion. The line engaging portion is provided with a series of spaced openings and a centrally located wing bolt. Thus, the control lines are passed through any desired pair of symetrically spaced openings depending upon the sensitivity of control desired and into engagement with the wing bolt where they are positively locked in place. The sheave web has formed therein an opening corresponding generally in size and shape to that of the manual control member, and offset from the center of the reel. The manual control member, when not in use, rests in the aforesaid opening and is releasably maintained therein by suitable means disposed on the reel. The reel web is provided with a circular raised portion or drum extending from near the peripheral channel to approximately the manual control member nesting opening and has a pair of circular holes formed therein at the center of the reel and adjacent the periphery thereof, the holes being large enough to accommodate the normal index finger. The channel shaped portion has slits formed therein adjacent the circular raised portion to provide line communication between the line engaging portion of the reel and the inner portion thereof.

Reference is now made to the drawing which illustrates a preferred embodiment of the present invention and is shown as employed in the control of a captive self-powered model aircraft generally identified by the numeral 10. The captive model aircraft 10 is of any well known type and is provided with a pair of variable elevators which may be controlled in the usual manner through a simple lever and linkage mechanism which is disposed on the aircraft fuselage or structure and, in turn, can be manipulated by a pair of control elements extending from the wing 11 of the aircraft 10. Retracting one of the control elements raises the aircraft elevators and advances the other control element, whereas retracting the other control element lowers the elevators and advances the first control element. The control elements are detachably secured by any well known fastening means to the free ends of the corresponding flexible control lines 12 and 13, the inner ends of which are fixed in transversely spaced relationship to a manual control member 14 constructed in accordance with the present invention, and held and manipulated by an operator. Thus, the captive aircraft 10 may be manipulated by the operator by the longitudinal rotation of the manual control member 14 to retract the corresponding control element through the control lines 12 and 13, thereby raising or lowering the elevators.

The manual control member 14 is of somewhat rectangular configuration, having an arcuate rear edge 16 and a forward portion 17. Formed in the control member 14 is an opening 18 surrounded by a shoulder 19 extending above and below the opening 18. The rear portion of the shoulder 19 is of undulating shape provided with four valleys to accommodate the fingers of an operator and defining a grip portion. Furthermore, the forward portion 17 has formed therein a plurality of regularly laterally spaced holes 20 which are engaged by metal grommets 21. The center hole 20 has registering therewith a wing bolt 22 which is engaged by a nut 23. The lead lines 12 and 13 are passed through any desired pair of holes 20 in accordance with the desired control sensitivity and are suitably fastened by means of the nut and bolt 23 and 22. Formed in the rear portion of the control member 14 is a hole 24 likewise provided with a metal grommet and permitting fastening the control member 14 to the wrist of the operator by means of a suitable string thereby preventing the total release of the control member 14 and the escape of the captive aircraft 10.

In order to suitably store the control lines 12 and 13 when not in use and to make them readily available for use, there is provided a storage reel comprising a sheave-like member 26 having a substantially flat web 27 and a channel-shaped, line-storing periphery 28. A generally rectangular opening 30 is formed in the web 27, the far side of the opening 30 being arcuate and defined by the cross wall of the channel shaped periphery 28. Furthermore, the opening 30 is of somewhat greater outer dimensions than the manual control member 14 and is laterally offset relative to the center of the web 27.

Extending inwardly from the opposing walls of the peripheral portion 28 are a pair of flanges 32 which overlay the outer edge of the opening 30 and are provided with inwardly directed shoulders 33 to define a well 34. Projecting inwardly from the end edges of the well 34 are a pair of shoulders 36. An elongated leaf spring 37 is housed in the well 34 and has its ends engaged by the outer corner edges of the well 34. Two pairs of opposed ears 38 are disposed along the inner edge of the opening 30 and present curved faced niches 39 toward the opening 30. Thus, by inserting the rear portion 16 of the manual control member 14 into the well 34 against the depressible leaf spring 37, nesting the control member 14 in the opening 30 and permitting the spring 37 to urge the forward edge of the control member 14 into engagement with the niches 39, the control member 14 may be stored or releasably retained by the reel or sheave 26. In order to release the control member 14, it is moved against the pressure of the spring 37 out of engagement with the niches 39, swung outwardly from the opening 30 and removed.

A pair of shallow circular cylindrical guide members or drums 40 are disposed on opposite sides of the web 27 and extend from a point closely spaced to the sheave peripheral portion 28 to a point on the other side of the center of the sheave in abutment with the adjacent edge of the opening 30. Extending through the guide drums 40 and the web 27 are the circular bores 41 and 42 of sizes to accommodate the index fingers of an operator, the bore 42 being coaxial with the sheave 26, and the bore 41 being disposed along the edge of the guide drum 40 adjacent the periphery of the sheave 26 and being parallel to the bore 42. Projecting outwardly from the upper peripheral edges of each of the guide drums 40 are a plurality of semi-circular ears 43 provided with inwardly directed shoulders 44. Slits 46 are formed in the side walls and cross wall of the channel shaped peripheral portion 28 adjacent the guide drum 40. Furthermore, a plurality of small holes 46' are formed in the side walls of the channel member 28 for the purpose of fastening the outermost ends of the lines 12, 13 when not attached to the craft 10.

It should be noted that both the reel 26 and the manual control member 14 may be formed of wood or metal, but they are preferably fabricated from an organic thermoplastic or thermosetting material such as polystyrene or the like. Furthermore, in the illustrated embodiment, the reel 26 is formed of two similar sections secured along a median plane to facilitate the manufacture thereof, and for economy of material the cylindrical guide drums 40 are hollow except for the walls surrounding the bores 41 and 42.

Considering the application and employment of the improved manual control member 14 and the reel 26, when it is desired to store the control lines 12 and 13, these lines are introduced into the reel by passing them together through the slits 46 around a side periphery of a drum 40 under the corresponding ears 43 and inserting the manual control member into locked position in the opening 30 as aforesaid. The lines are reeled up into the peripheral groove of the sheave 26 by inserting an index finger into the coaxial bore 42 and rotating the sheave 26 about this index finger by means of the index finger of the other hand which engages the eccentric bore 41. It is desirable to keep the control lines 12 and 13 taut to avoid bends which will foul and catch when flying the captive aircraft. When preparing the aircraft 10 for controlled flying, the ends of the control lines 12 and 13 are attached to the corresponding control elements on the model aircraft 10, the engine is started, the lines 12 and 13 are unreeled and the control member 14 is detached from the sheave 26. The aircraft 10 may now be flown and maneuvered as desired.

While a preferred embodiment of the present invention has been described and illustrated, it is apparent that numerous omissions and alterations may be made without departing from the spirit thereof as set forth in the following claims.

I claim:

1. An improved reel for the storage of a manual control member for captive devices and of the control lines secured to said manual control member, comprising a substantially circular web portion, an annular portion disposed along the periphery of said web portion and provided with an outwardly directed groove defining a storage space for said control lines, said annular portion having a radial slot formed therein affording communication between said groove and said web portion for the passage of said control lines to said manual control member and means for releasably engaging and retaining said control member within said annular portion.

2. An improved reel in accordance with claim 1, including line guide means disposed on said web portion and leading from said control member retaining means to said slot formed in said annular portion.

References Cited in the file of this patent

UNITED STATES PATENTS

| | | |
|---|---|---|
| 1,983,565 | Replogle | Dec. 11, 1934 |
| 2,507,053 | Rymer | May 9, 1950 |
| 2,573,219 | Pursell | Oct. 30, 1951 |
| 2,602,604 | Russell et al. | July 8, 1952 |